United States Patent
El-Khamy et al.

(10) Patent No.: US 11,599,979 B2
(45) Date of Patent: *Mar. 7, 2023

(54) METHOD AND APPARATUS FOR VIDEO SUPER RESOLUTION USING CONVOLUTIONAL NEURAL NETWORK WITH TWO-STAGE MOTION COMPENSATION

(71) Applicant: Samsung Electronics Co., Ltd., Gyeonggi-do (KR)

(72) Inventors: Mostafa El-Khamy, San Diego, CA (US); Haoyu Ren, San Diego, CA (US); Jungwon Lee, San Diego, CA (US)

(73) Assignee: Samsung Electronics Co., Ltd

(*) Notice: Subject to any disclaimer, the term of this patent is extended or adjusted under 35 U.S.C. 154(b) by 14 days.

This patent is subject to a terminal disclaimer.

(21) Appl. No.: 16/887,511

(22) Filed: May 29, 2020

(65) Prior Publication Data
US 2020/0294217 A1    Sep. 17, 2020

Related U.S. Application Data

(63) Continuation of application No. 15/946,531, filed on Apr. 5, 2018, now Pat. No. 10,733,714.
(Continued)

(51) Int. Cl.
G06T 5/50 (2006.01)
G06K 9/62 (2022.01)
(Continued)

(52) U.S. Cl.
CPC .............. G06T 5/50 (2013.01); G06K 9/6256 (2013.01); G06T 3/0093 (2013.01);
(Continued)

(58) Field of Classification Search
CPC ....... G06T 5/50; G06T 3/4053; G06T 3/4046; G06T 3/0093; G06T 2207/10016;
(Continued)

(56) References Cited

U.S. PATENT DOCUMENTS 7,123,780 B2    10/2006  Carrig
8,842,730 B2    9/2014   Zhou et al.
(Continued)

FOREIGN PATENT DOCUMENTS

CN    107274347    10/2017

OTHER PUBLICATIONS

Nasrollahi, Kamal et al. Superresolution: a comprehensive survey. Machine vision and applications, 25:1423-1468, 2014.
(Continued)

*Primary Examiner* — Bobbak Safaipour
(74) *Attorney, Agent, or Firm* — The Farrell Law Firm, P.C.

(57) ABSTRACT

A method and an apparatus are provided. The method includes receiving a video with a first plurality of frames having a first resolution; generating a plurality of warped frames from the first plurality of frames based on a first type of motion compensation; generating a second plurality of frames having a second resolution, wherein the second resolution is of higher resolution than the first resolution, wherein each of the second plurality of frames having the second resolution is derived from a subset of the plurality of warped frames using a convolutional network; and generating a third plurality of frames having the second resolution based on a second type of motion compensation, wherein each of the third plurality of frames having the second resolution is derived from a fusing a subset of the second plurality of frames.

16 Claims, 8 Drawing Sheets

Related U.S. Application Data

(60) Provisional application No. 62/583,633, filed on Nov. 9, 2017.

(51) Int. Cl.
  *G06T 3/00* (2006.01)
  *G06T 3/40* (2006.01)
  *G06V 30/24* (2022.01)

(52) U.S. Cl.
  CPC .......... *G06T 3/4046* (2013.01); *G06T 3/4053* (2013.01); *G06V 30/2504* (2022.01); *G06T 2207/10016* (2013.01); *G06T 2207/20084* (2013.01); *G06T 2207/20221* (2013.01)

(58) Field of Classification Search
  CPC . G06T 2207/20084; G06T 2207/20221; G06T 5/003; G06T 2207/20212; G06K 9/6857; G06K 9/6256
  See application file for complete search history.

(56) References Cited

U.S. PATENT DOCUMENTS

| | | | | |
|---|---|---|---|---|
| 9,230,303 | B2* | 1/2016 | Kanaev | G06T 7/269 |
| 9,754,351 | B2 | 9/2017 | Paluri et al. | |
| 10,776,688 | B2* | 9/2020 | Jiang | G06N 3/0454 |
| 10,785,471 | B1* | 9/2020 | Hunt | H04N 13/366 |
| 2004/0252230 | A1* | 12/2004 | Winder | G06T 5/002 |
| | | | | 348/E7.071 |
| 2011/0057933 | A1* | 3/2011 | Lyashevsky | H04N 19/521 |
| | | | | 345/428 |
| 2013/0058397 | A1* | 3/2013 | Song | H04N 19/573 |
| | | | | 375/E7.126 |
| 2017/0262705 | A1 | 9/2017 | Li et al. | |
| 2017/0295354 | A1* | 10/2017 | Cabral | H04N 5/247 |
| 2017/0337682 | A1* | 11/2017 | Liao | A61B 5/7267 |
| 2017/0339431 | A1 | 11/2017 | Zhang et al. | |
| 2018/0081429 | A1* | 3/2018 | Akenine-Moller | G06T 3/0093 |
| 2019/0045193 | A1* | 2/2019 | Socek | G06T 7/277 |
| 2019/0068991 | A1* | 2/2019 | Xu | H04N 19/172 |
| 2019/0139205 | A1* | 5/2019 | El-Khamy | G06K 9/6256 |
| 2019/0206026 | A1* | 7/2019 | Vemulapalli | G06T 7/248 |
| 2019/0228309 | A1* | 7/2019 | Yu | G05B 13/048 |
| 2021/0103764 | A1* | 4/2021 | Pourian | G06V 10/757 |

OTHER PUBLICATIONS

Yang, Chih-Yuan et al. Single-image super-resolution: A benchmark. ECCV, 372-386, 2014.
Glasner, Daniel et al. Image Super-resolution from a single image. CVPR, 349-356, 2009.
Kim, Kwang In et al. Single-image super-resolution using sparse regression and natural image prior. TPAMI, 32:1127-1133, 2010.
Chang, Hong et al. Super-resolution through neighbor embedding. CVPR, 2004, pp. 8.
Timofte, Radu et al. Anchored neighborhood regression for fast example-based super-resolution. ICCV, 2013, pp. 8.
Timofte, Radu et al. Anchored neighborhood regression for fast example-based super-resolution. ACCV, 2014, pp.
Yang, Jianchao et al. Image super-resolution via sparse representation. TIP, 19:2861-2873, 2010.
Dong, Chao et al. Image super-resolution using deep convolutional networks. TPAMI, 38:295-307, 2016.
Kim, Jiwon et al. Accurate image super-resolution using very deep convolutional networks. CVPR, 1646-1654, 2016.
Kim, Jiwon et al. Deeply-recursive convolutional network for image super-resolution. CVPR, 1637-1645, 2016.
Ledig, Christian et al. Photo-realistic single image super-resolution using a generative adversarial network. CVPR, 1609.04802, 2017.
Dahl, Ryan et al. Pixel Recursive Super Resolution. ICCV, 2017, pp. 10.
Freeman, William et al. Example-based super-resolution. IEEE Computer graphics and Applications, 22:56-65, 2002.
Huang, Jia-Bin et al. Single image super-resolution from transformed self-exemplars. CVPR, 5197-5206, 2015.
Zhang, Kaibing et al. Multi-scale dictionary for single image super-resolution. CVPR, 1114-1121, 2012.
Schulter, Samuel et al. Horst. Fast and accurate image upscaling with super-resolution forests. CVPR, 3791-3799, 2015.
Wang, Zhaowen at al. Deep networks for image super-resolution with sparse prior. ICCV, 370-378, 2015.
Ren, Haoyu et al. Image Super Resolution Based on Fusing Multiple Convolution Neural Networks. CVPRW, 2017, pp. 8.
Shi, Wenzhe et al. Real-time single image and video super-resolution using an efficient sub-pixel convolutional neural network. CVPR, 1874-1883, 2016.
Dong, Chao et al. Accelerating the super-resolution convolutional neural network. ECCV, 391-407, 2016.
Liu, Ce et al. On Bayesian adaptive video super resolution. TPAMI, 36:346-360, 2014.
Kappeler, Armin et al. Video super-resolution with convolutional neural networks. IEEE Transactions on Computational Imaging, 2:109-122, 2016.
Ma, Ziyang et al. Handling motion blur in multiframe super-resolution. CVPR, 5224 5232, 2015.
Takeda, Hiroyuki et al. Super-resolution without explicit subpixel motion estimation. TIP, vol. 18, pp. 1958-1975, 2009.
Lai, Wei-Sheng et al. Deep Laplacian Pyramid Networks for Fast and Accurate Super-Resolution. CVPR, 2017, pp. 9.
Tai, Ying, et al. Image Super-Resolution via Deep Recursive Residual Network. CVPR, 2017, pp. 9.
Caballero, Jose, et al. Real-Time Video Super-Resolution With Spatio-Temporal Networks and Motion Compensation. CVPR, 2017. pp 10.
Lim, Bee et al. Enhanced deep residual networks for single image super-resolution. CVPRW, 2017, pp. 9.
Farsiu, Sina et al. Fast and robust multiframe super resolution. TIP, vol. 13, pp. 1327-1344, 2004.
Tao, Xin et al. Detail-revealing Deep Video Super-resolution. ICCV, 2017, pp. 9.
Liu, Ding et al.Robust video superresolution with learned temporal dynamics. ICCV, 2017, pp. 9.
Flownet 2.0: Evolution of optical flow estimation with deep networks. Ilg, Eddy et al. CVPR, 2017, pp. 9.
Anchored Regression Networks Applied to Age Estimation and Super Resolution. Agustsson, Eirikur et al. ICCV, 2017, pp. 10.
EnhanceNet: Single Image Super-Resolution Through Automated Texture Synthesis. Sajjadi, Mehdi et al. ICCV, 2017, pp. 10.
Video superresolution via deep draft-ensemble learning. R. Liao, et al., CVPR, 2015, pp. 9.
Video Super-Resolution via Bidirectional Recurrent Convolutional Networks. Huang, Yan et al., PAMI, 2017, pp. 14.
Kernel regression for image processing and reconstruction. Kernel reTakeda, Hiroyuki et al., TIP, vol. 16, pp. 349-366, 2007.
Sparse representation-based multiple frame video super-resolution Dai, Qiqin et al., TIP, vol. 26, pp. 756-781, 2017.
Space-time superresolution from a single video. O. Shahar et al., CVPR, vol. 26, pp. 756-781, 2011.
A duality based approach for realtime TV-L 1 optical flow. Zach, Christopher et al., Pattern Recognition, vol. 17, pp. 214-223, 2007.
The Consumer Digital Video Library, http://www.cdvl.org, pp. 2.
Chen, Chao et al., Modeling the timeVarying subjective quality of HTTP video streams with rate adaptations. TIP, vol. 23, pp. 2206-2221, 2014.
K. Seshadrinathan, et al., Study of Subjective and Objective Quality Assessment of Video. TIP, vol. 19, pp. 1427-1441, 2010.
Ilg, Eddy et al., Supplementary Material for FlowNet 2.0: Evolution of Optical Flow Estimation with Deep Networks, arXiv:1612.01925 [cs.CV], Dec. 6, 2016, 6 pages.
Anonymous CVPR submission, Video Super Resolution Based on Deep Convolution Neural Network and Two-stage Motion Compensation, CVPR 2018 submission, 9 pages.

* cited by examiner

METHOD AND APPARATUS FOR VIDEO SUPER RESOLUTION USING CONVOLUTIONAL NEURAL NETWORK WITH TWO-STAGE MOTION COMPENSATION

PRIORITY

This application is a Continuation Application of U.S. patent application Ser. No. 15/946,531, filed on Apr. 5, 2018, which claims priority under 35 U.S.C. § 119(e) to a U.S. Provisional Patent Application filed on Nov. 9, 2017 in the United States Patent and Trademark Office and assigned Ser. No. 62/583,633, the entire contents of which are incorporated herein by reference.

FIELD

The present disclosure relates generally to video super resolution (SR), and more particularly, to an apparatus and a method of video SR using a convolutional neural network (CNN) with two-stage motion compensation.

BACKGROUND

Video super resolution is a process for recovering a high resolution (HR) video from a low resolution (LR) video. Video super resolution improves quality and retrieves information from low-resolution videos that have been used in mobile/smart phone cameras. Among some typical video super resolution systems, a deep CNN is used.

The accuracy of a conventional video SR system is limited since temporal motion information is not used well. Conventional video SR methods only use the motion in the LR domain.

An issue in constructing a CNN-based video super resolution system is related to the use of temporal information to align frames. Most conventional methods receive an optical flow in LR only, and apply image warping for motion compensation. The performance is limited because only LR motion is considered.

SUMMARY

According to one embodiment, a method is provided. The method includes receiving a video with a first plurality of frames having a first resolution; generating a plurality of warped frames from the first plurality of frames based on a first type of motion compensation; generating a second plurality of frames having a second resolution, wherein the second resolution is of higher resolution than the first resolution, wherein each of the second plurality of frames having the second resolution is derived from a subset of the plurality of warped frames using a convolutional network; and generating a third plurality of frames having the second resolution based on a second type of motion compensation, wherein each of the third plurality of frames having the second resolution is derived from a fusing a subset of the second plurality of frames.

According to one embodiment, an apparatus is provided. The apparatus includes a receiver configured to receive a video with a first plurality of frames having a first resolution; a first resolution compensation device configured to generate a plurality of warped frames from the first plurality of frames based on a first type of motion compensation; a multi-image spatial super resolution (SR) device configured to generate a second plurality of frames having a second resolution, wherein the second resolution is of higher resolution than the first resolution, wherein each of the second plurality of frames having the second resolution is derived from a subset of the plurality of warped frames using a convolutional network; and a second resolution motion compensation device configured to generate a third plurality of frames having the second resolution based on a second type of motion compensation, wherein each of the third plurality of frames having the second resolution is derived from a fusing a subset of the second plurality of frames.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
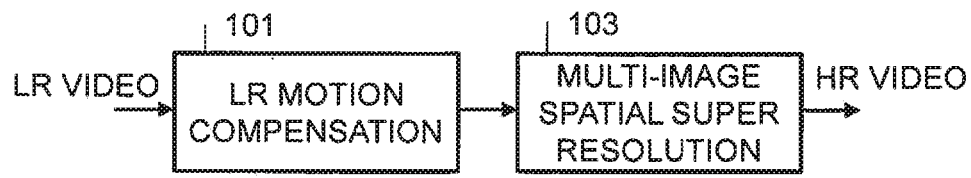
FIG. 1 is a block diagram of a video SR system, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

FIG. 1 is a flow diagram of a video SR system, according to one embodiment. The video SR system includes a LR motion compensation device 101 and a multi-stage spatial SR resolution device 103.

Figure 2:
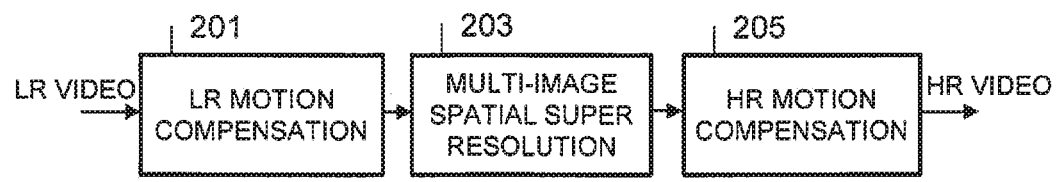
FIG. 2 is a block diagram of the present video SR system with two-stage motion compensation, according to one embodiment.

FIG. 2 is a block diagram of the present video SR system with two-stage motion compensation, according to one embodiment. The present video SR system includes a LR motion compensation device 201, a multi-stage spatial SR resolution device 203, and a HR motion compensation device 205. The HR motion compensation device 205 receives an intermediate HR output, which is the output of the multi-image spatial SR device 203 as an input, and outputs refined HR frames.

Figure 3:
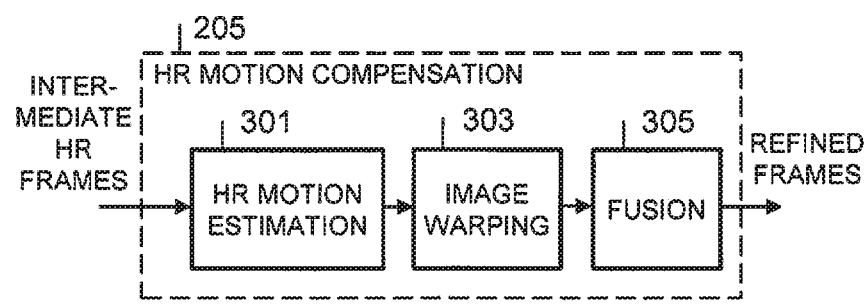
FIG. 3 is a block diagram of the present HR motion compensation module, according to one embodiment.

FIG. 3 is a block diagram of the present HR motion compensation device, according to one embodiment. The HR motion compensation device 305 includes a HR motion estimation device 301, an image warping device 303, and a fusion device 305, where warping indicates to change a shape (e.g., bending, twisting), and where fusion indicates joining.

The HR motion compensation device 205 receives intermediate HR frames generated by the multi-image spatial SR device 203 as inputs, calculates an HR optical flow, uses the HR optical flow to warp the intermediate HR frames, and applies weighted fusion to the warped HR frames to generate refined frames as an output, where weighted fusion indicates performing fusion in accordance with an assigned weight.

The present system includes two methods for HR motion estimation as described in FIG. 4 and FIG. 5 below.

Figure 4:
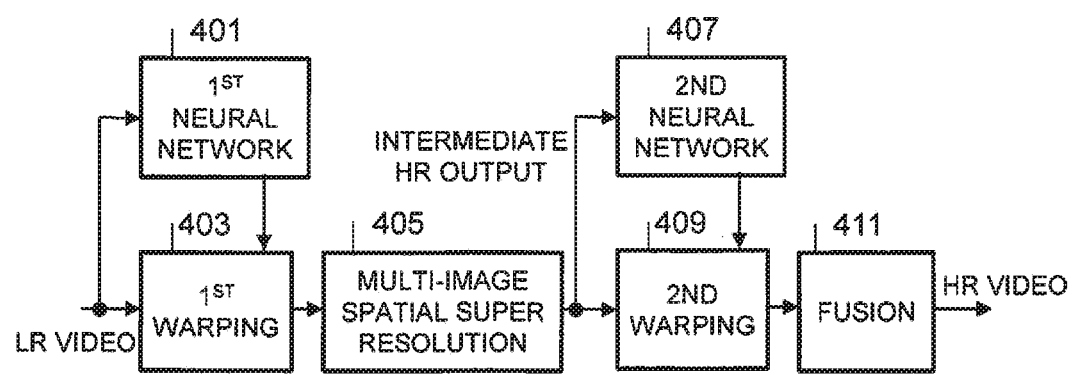
FIG. 4 is another block diagram of implementing the present video SR system, according to one embodiment.

FIG. 4 is another block diagram of implementing the present video SR system, according to one embodiment. The present video SR system includes a neural network (e.g., a CNN) with two-stage compensation. The present HR motion compensation device includes a first neural network device 401, a first warping device 403, a multi-image spatial super resolution device 405, a second neural network device 407, a second warping device 409, and a fusion device 411, where warping occurs prior to fusion.

The first neural network device 401 and the first warping device 403 receives a LR video. The first neural network device 401 may apply FlowNet 2.0 directly to the frames of the received LR video to determine an optical flow of the LR video. The first neural network device 401 provides increased accuracy at an increased computation cost. In addition, to determine an optical flow of an intermediate HR output, the present video super resolution system waits for the multi-image spatial SR device 405 to generate the intermediate HR output. Thus, efficiency is relatively low.

The second warping device 409 may perform the same warping function as the second warping device 403.

The fusion device may include a fusion method based on Gaussian weights and motion penalization after image warping. The video super resolution system includes three devices: a LR motion compensation device, a multi-image spatial SR device, and a HR motion compensation device. The first neural network device 401 and the first warping device 403 may be part of the LR motion compensation device. The multi-image spatial SR device 405 may be part of the multi-image spatial SR device. The second neural network device 407, the second warping device 409, and the fusion device 411 may be part of the HR motion compensation device.

Figure 5:
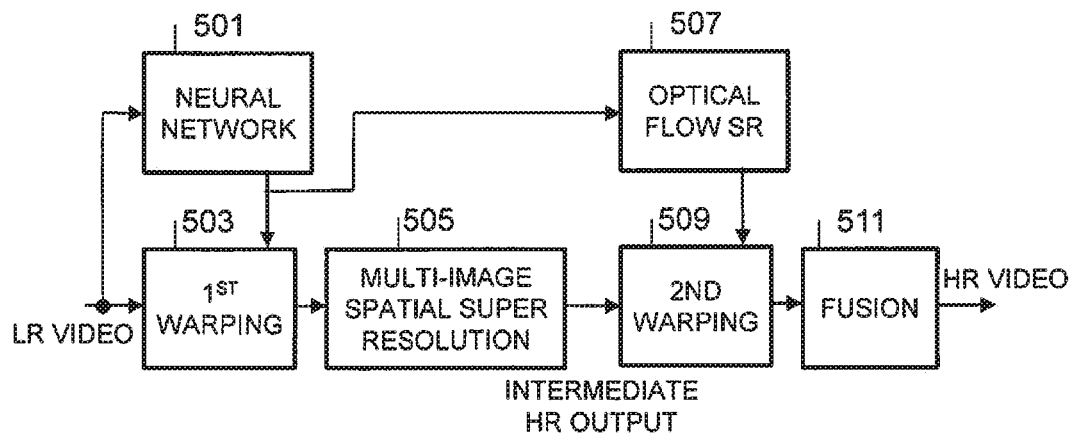
FIG. 5 is another block diagram of implementing the present video SR system, according to one embodiment.

FIG. 5 is another block diagram of implementing the present video SR system, according to one embodiment. The present video SR system includes a neural network (e.g., a CNN) and optical flow SR with two-stage motion compensation. The present HR motion compensation device includes a neural network device 501, a first warping device 503, a multi-image spatial super resolution device 505, an optical flow super resolution device 507, a second warping device 509, and a fusion device 511.

The neural network device 501 and the first warping device 503 receive a LR video. The neural network device 501 may apply FlowNet 2.0 directly to the frames of the received LR video to determine an optical flow of the LR video.

The optical flow super resolution device 507 receives the optical flow of the received LR video determined by the neural network device 501. The optical flow super resolution device 507 determines a HR optical flow based on the LR optical flow determined by the neural network device 501 and a super resolution network method.

The video super resolution system as described in FIG. 5 has at least two advantages as compared to the video super resolution system as described in FIG. 4. First, determining an SR optical flow based on an LR optical flow is much faster (e.g., more than 10 times faster) as compared to directly applying a neural network method to determine an HR optical flow. Second, an intermediate HR output is not needed to determine the SR optical flow. Thus, spatial SR and optical SR may be executed in parallel, which increases efficiency.

The video super resolution method described above with reference to FIG. 4 may achieve ~0.2-0.4 dB better performance as compared to the conventional video super resolution method described above with reference to FIG. 1 that does not include HR motion compensation, but with an additional computation cost of 150 ms/frame, where 150 ms/frame is for videos with resolution 720×480. For a larger/smaller image, the additional computation cost will also be larger/smaller. The video super resolution method described above with reference to FIG. 5 may achieve ~0.1-0.2 dB better performance as compared to the conventional video super resolution method described above with reference to FIG. 1, without an additional computation cost.

The second warping device 509 may perform the same warping function as the first warping device 503.

The fusion device 511 may include a fusion method based on Gaussian weights and motion penalization after image warping. The video super resolution system described above with reference to FIG. 4 includes three devices: an LR motion compensation device, a multi-image spatial SR device, and an HR motion compensation device. The neural network device 501 and the first warping device 503 may be part of the LR motion compensation device. The multi-image spatial super resolution device 505 may be part of the multi-image spatial SR device. The optical flow super resolution device 507, the second warping device 509, and the fusion device 511 may be part of the HR motion compensation device.

Referring back to FIG. 2, the LR motion compensation device 201 receives three consecutive LR frames $I_{t-1}^L I_t^L I_{t+1}^L$ as input, and outputs three warped frames $I'_{t-1}^L I'_t^L I'_{t+1}^L$, in Equations (1)-(3) as follows:

$$I'_{t-1}{}^L = W_{t-1}{}^L I_{t-1}{}^L \quad (1)$$

$$I'_t{}^L = I_t{}^L \quad (2)$$

$$I'_{t+1}{}^L = W_{t+1}{}^L I_{t+1}{}^L \quad (3)$$

where $W_{t-1}^L$ and $W_{t+1}^L$ are the optical flow from LR frame t−1/t+1 to frame t. To calculate the LR optical flow, a pre-trained FlowNet 2.0 neural network may be utilized.

Figure 6:
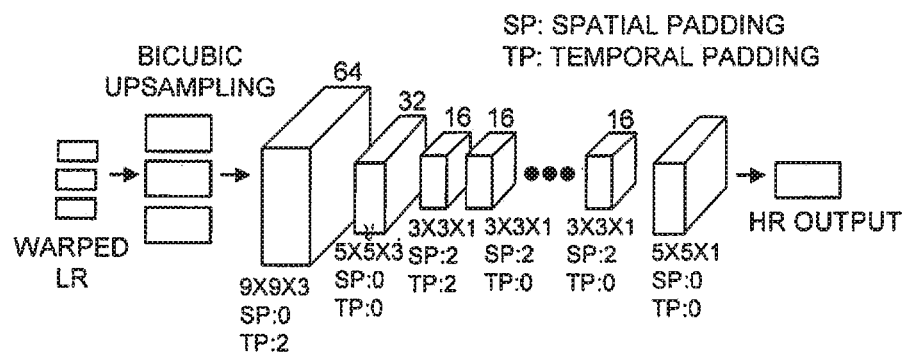
FIG. 6 is an exemplary diagram for illustrating multi-spatial SR based on three dimensional (3D) SR CNN (SRCNN), according to one embodiment.

FIG. 6 is an exemplary diagram for illustrating multi-spatial SR based on three dimensional (3D) SR CNN (SRCNN), according to one embodiment.

Referring to FIG. 6, the multi-image spatial SR device 203, 405, or 505 may be a 3D-convolution network with multi-channel input and single-channel output. The multi-image spatial SR device 203, 405, or 505 may receive three warped LR frames $I'_{t-1}^L I'_t^L I'_{t+1}^L$ as input, and output a single intermediate HR frame $I_t^L$. This network may be implemented based on 3D-convolution and a cascade trained SRCNN.

A 3D SRCNN network may include 19 layers and a '9-5-3-3-...-3-5' architecture as illustrated in FIG. 6. The first layer "9" may have 9×9×3 3D kernels and 64 filters, the second layer "5" may have 5×5×3 3D kernels and 32 filters. Each of layers "3" (e.g., the intermediate layers) contain 16 3×3×1 2D-convolution filters. The last layer "5" may have 5×5×1 2D kernels. All the kernels have stride 1. 2-pixel spatial zero padding (sp) is applied for the intermediate layers to make the output feature map size the same as the input feature map. The first 3D-convolution layer has an additional 2-pixel temporal zero padding (tp).

The HR motion compensation device 205 may receive three consecutive intermediate HR frames $I_{t-1}^H I_t^H I_{t+1}^H$ as input, and output single refined frames $I_t^{*H}$. HR motion compensation is achieved by HR motion estimation, image warping, and fusion.

HR motion estimation may be performed by determining an HR optical flow $W_{t-1}^H$ and $W_{t+1}^H$. As described above, the present disclosure provides two methods for determining HR optical flow. That is, either directly calculating HR optical flow by applying FlowNet 2.0 on $I_{t-1}^H I_t^H I_{t+1}^H$, or performing super resolution on an LR flow $W_{t-1}^L$ and $W_{t+1}^L$.

For performing super resolution on an LR flow $W_{t-1}^L$ and $W_{t+1}^L$, any image super resolution network may be used to construct an optical flow super resolution network. According to one embodiment, a 3-layer SRCNN may be used. Since optical flow has two channels x and y, the SRCNN may be trained on each channel, respectively, with weight sharing between the two channels.

Figure 7:
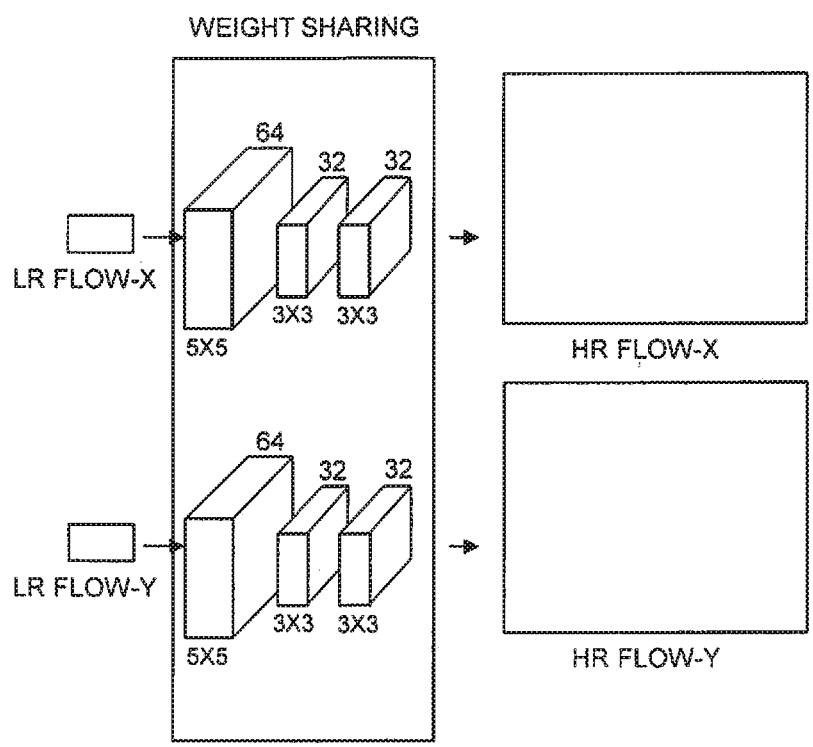
FIG. 7 is an exemplary diagram for illustrating training of an SRCNN for efficient HR motion estimation, according to one embodiment.

FIG. 7 is an exemplary diagram for illustrating training of an SRCNN, according to one embodiment.

Referring to FIG. 7, the SRCNNs are trained on an x-optical flow and a y-optical flow, respectively. Weights in the SRCNN that is trained on the x-optical flow are shared with the SRCNN that is trained on the y-optical flow.

After deriving the HR optical flow $W_{t-1}^H$ and $W_{t+1}^H$, the input HR images $I_{t-1}^H I_t^H I_{t+1}^H$ are warped in Equations (4)-(6) as follows:

$$I'_{t-1}{}^H = W_{t-1}{}^H I_{t-1}{}^H \quad (4)$$

$$I'_t{}^H = I_t{}^H \quad (5)$$

$$I'_{t+1}{}^H = W_{t+1}{}^H I_{t+1}{}^H \quad (6)$$

The present system fuses the warped HR frames $I'_{t-1}^H I'_t^H I'_{t+1}^H$ to a single refined HR output $I_t^{*H}$. The present system includes a weighted fusion method, where the weights are penalized by the magnitude of the optical flow in Equation (7) as follows:

$$I_t^{*H} = \frac{w_{t+1} \cdot I'_{t+1}^H + w_t \cdot I'_t^H + w_{t-1} \cdot I'_{t-1}^H}{w_{t+1} + w_t + w_{t-1}} \quad (7)$$

where $w_t$ is a weight matrix with the same size as $I_t^H$. Each element $w_{i,j}$ in w may be calculated in Equation (8) as follows:

$$w_{i,j} = \frac{1}{\sigma\sqrt{2\pi}} e^{\frac{-2z_{i,j}^2}{2\sigma^2}} \quad (8)$$

where z(i,j) is the magnitude of the optical flow of pixel (i,j), sigma is a constant.

If the motion in pixel (i,j) is larger, the corresponding weight $w_{i,j}$ will be smaller in the fusion. This may reduce motion blur in an output frame.

Figure 8:
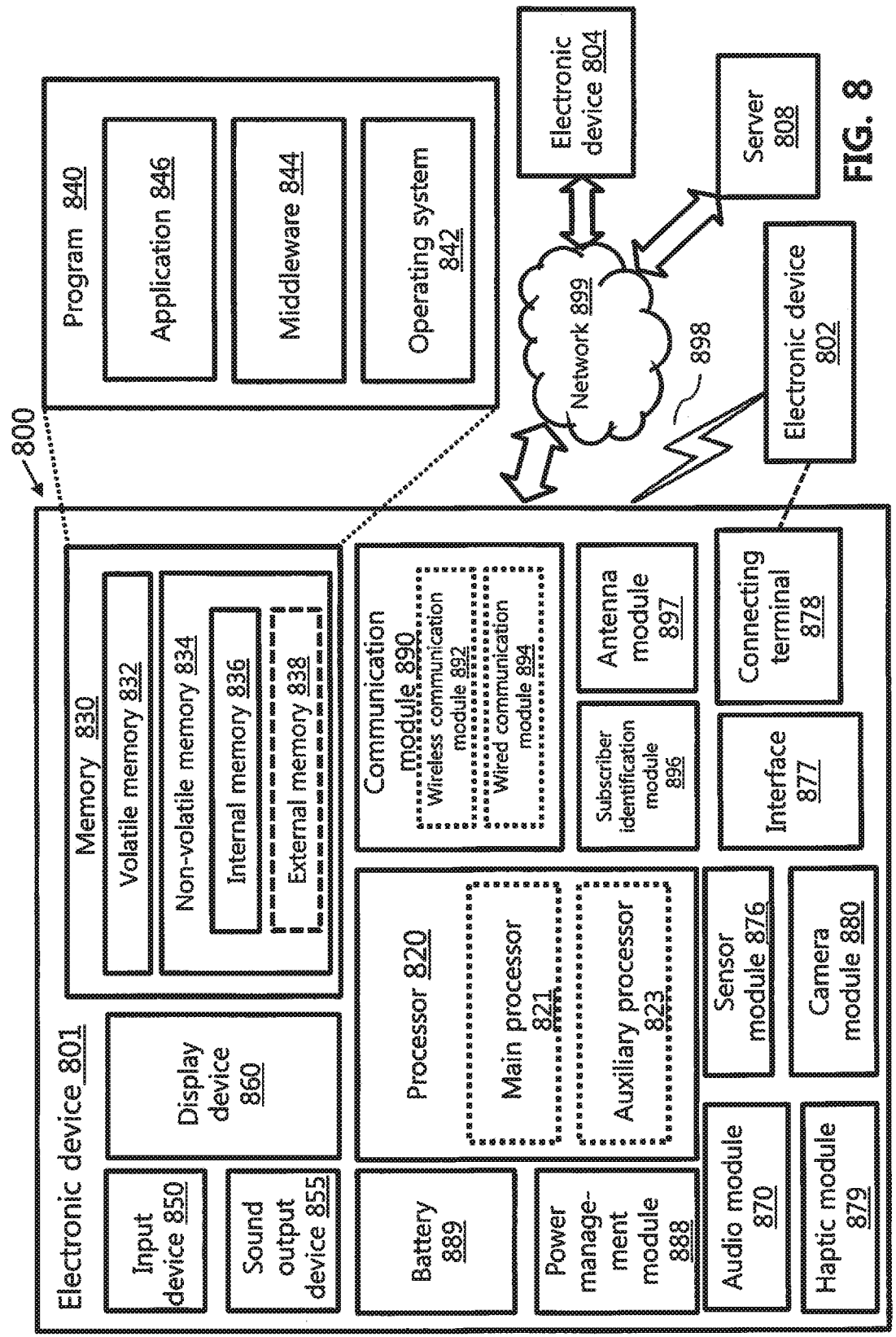
FIG. 8 is a block diagram of an electronic device in a network environment, according to one embodiment.

FIG. 8 is a block diagram of an electronic device 801 in a network environment 800, according to one embodiment.

Referring to FIG. 8, the electronic device 801 in the network environment 800 may communicate with an electronic device 802 via a first network 898 (e.g., a short-range wireless communication network), or with an electronic device 804 or a server 808 via a second network 899 (e.g., a long-range wireless communication network). According to one embodiment, the electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. According to one embodiment, as at least part of the data processing or computations, the processor 820 may load a command or data received from another component (e.g., the sensor module 876 or the communication module 890) in the volatile memory 832, process the command or the data stored in the volatile memory 832, and store resulting data in the non-volatile memory 834. According to one embodiment, the processor 820 may include a main processor 821 (e.g., a central processing unit (CPU), an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device (e.g., the electronic device 802) directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to one embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wired) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to one embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to one embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2nd$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

One embodiment may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. According to one embodiment, one or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 9:
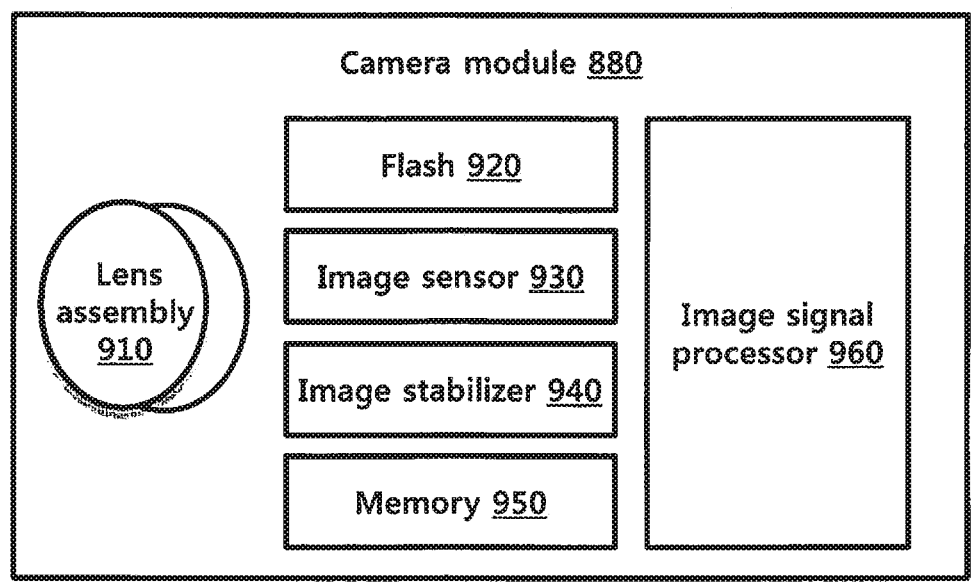
FIG. 9 is a block diagram of a camera module, according to one embodiment.

FIG. 9 is a block diagram of the camera module 880, according to one embodiment.

Referring to FIG. 9, the camera module 880 may include a lens assembly 910, a flash 920, an image sensor 930, an image stabilizer 940, a memory 950 (e.g., a buffer memory), or an image signal processor 960. The lens assembly 910 may collect light emitted or reflected from an object whose image is to be taken. The lens assembly 910 may include one or more lenses. According to one embodiment, the camera module 880 may include a plurality of lens assemblies 910. In this case, the camera module 880 may form, for example, a dual camera, a 360-degree camera, or a spherical camera. Some of the plurality of lens assemblies 910 may have the same lens attribute (e.g., view angle, focal length, auto-focusing, f number, or optical zoom), or at least one lens assembly may have one or more lens attributes that are different from those of another lens assembly. The lens assembly 910 may include, for example, a wide-angle lens or a telephoto lens.

The flash 920 may emit light that is used to reinforce light reflected from an object. According to one embodiment, the flash 920 may include one or more light emitting diodes (LEDs) (e.g., a red-green-blue (RGB) LED, a white LED, an infrared (IR) LED, or an ultraviolet (UV) LED) or a xenon lamp. The image sensor 930 may obtain an image corresponding to an object by converting light emitted or reflected from the object and transmitted via the lens assembly 910 into an electrical signal. According to one embodiment, the image sensor 930 may be selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 930 may be implemented using, for example, a charged coupled device (CCD) sensor or a complementary metal oxide semiconductor (CMOS) sensor.

The image stabilizer 940 may move the image sensor 930 or at least one lens included in the lens assembly 910 in a particular direction, or control an operational attribute (e.g., adjust the read-out timing) of the image sensor 930 in response to the movement of the camera module 880 or the electronic device 801 including the camera module 880. This allows compensating for at least part of a negative effect (e.g., image blurring) by the movement on an image being captured. According to one embodiment, the image stabilizer 940 may sense such a movement by the camera module 880 or the electronic device 801 using a gyro sensor or an acceleration sensor disposed inside or outside the camera module 880. According to one embodiment, the image stabilizer 940 may be implemented, for example, as an optical image stabilizer.

The memory 950 may store an image for a subsequent image processing task. For example, if image capturing is delayed due to shutter lag or multiple images are quickly captured, a raw image obtained (e.g., a Bayer-patterned image, a high-resolution image) may be stored in the memory 950, and its corresponding copy image (e.g., a low-resolution image) may be previewed via the display device 860. Thereafter, if a specified condition is met (e.g., by a user's input or system command), at least part of the raw image stored in the memory 950 may be obtained and processed, for example, by the image signal processor 960. According to one embodiment, the memory 950 may be configured as at least part of the memory 830 or as a separate memory that is operated independently from the memory 830.

The image signal processor 960 may perform one or more image processing with respect to an image obtained via the image sensor 930 or an image stored in the memory 950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 960 may perform control (e.g., exposure time control or read-out timing control) with respect to at least one (e.g., the image sensor 930) of the components included in the camera module 880. An image processed by the image signal processor 960 may be stored in the memory 950 for further processing, or may be provided to an external component (e.g., the memory 830, the display device 860, the electronic device 802, the electronic device 804, or the server 808) outside the camera module 880. According to one embodiment, the image signal processor 960 may be configured as at least part of the processor 820, or as a separate processor that is operated independently from the processor 820. If the image signal processor 960 is configured as a separate processor from the processor 820, at least one image processed by the image signal processor 960 may be displayed, by the processor 820, via the display device 860 as it is or after being further processed.

According to one embodiment, the electronic device 801 may include a plurality of camera modules 880 having different attributes or functions. In this case, at least one of the plurality of camera modules 880 may form, for example, a wide-angle camera and at least another of the plurality of camera modules 880 may form a telephoto camera. Similarly, at least one of the plurality of camera modules 880 may form, for example, a front camera and at least another of the plurality of camera modules 880 may form a rear camera.

Figure 10:
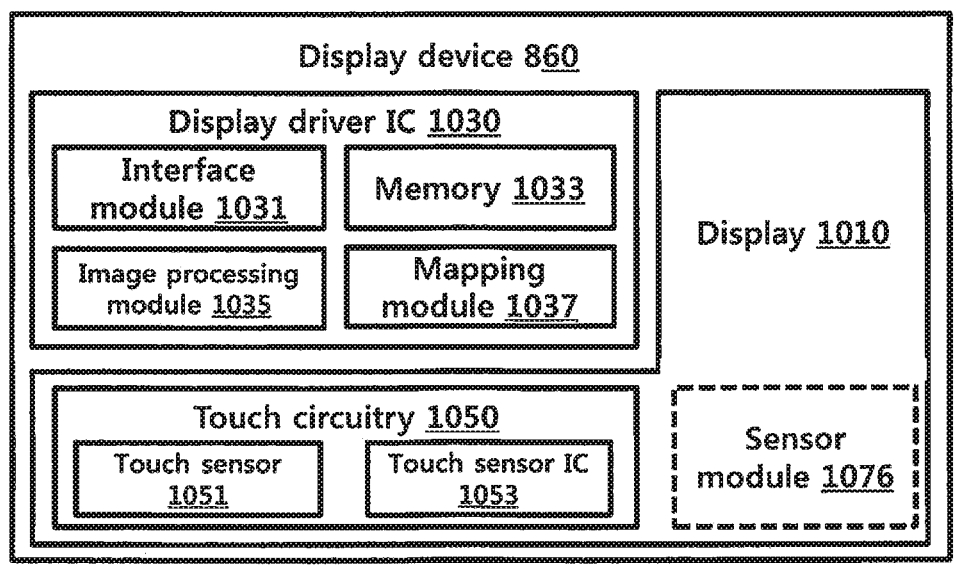
FIG. 10 is a block diagram of a display device, according to one embodiment.

FIG. 10 is a block diagram of the display device 860, according to one embodiment.

Referring to FIG. 10, the display device 860 may include a display 1010 and a display driver integrated circuit (DDI) 1030 to control the display 1010. The DDI 1030 may include an interface module 1031, a memory 1033 (e.g., a buffer memory), an image processing module 1035, or a mapping module 1037. The DDI 1030 may receive image information that contains image data or an image control signal corresponding to a command to control the image data from another component of the electronic device 801 via the interface module 1031. For example, according to one embodiment, the image information may be received from the processor 820 (e.g., the main processor 821 (e.g., an AP)) or the auxiliary processor 823 (e.g., a graphics processing unit) operated independently from the function of the main processor 821. The DDI 1030 may communicate, for example, with touch circuitry 1050 or the sensor module 1076 via the interface module 1031. The DDI 1030 may also store at least part of the received image information in the memory 1033, for example, on a frame by frame basis.

The image processing module 1035 may perform pre-processing or post-processing (e.g., adjustment of resolution, brightness, or size) with respect to at least part of the image data. According to one embodiment, the pre-processing or post-processing may be performed, for example, based at least in part on one or more characteristics of the image data or one or more characteristics of the display 1010.

The mapping module 1037 may generate a voltage value or a current value corresponding to the image data pre-processed or post-processed by the image processing module 1035. According to one embodiment, generation of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

According to one embodiment, the display device 860 may further include the touch circuitry 1050. The touch circuitry 1050 may include a touch sensor 1051 and a touch sensor IC 1053 to control the touch sensor 1051. The touch sensor IC 1053 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electrical charges) corresponding to the certain position on the display 1010. The touch circuitry 1050 may provide input information (e.g., a position, an area, a pressure, or a time) indicative of the touch input or the hovering input detected via the touch sensor 1051 to the processor 820. According to one embodiment, at least part (e.g., the touch sensor IC 1053) of the touch circuitry 1050 may be formed as part of the display 1010 or the DDI 1030, or as part of another component (e.g., the auxiliary processor 823) disposed outside the display device 860.

According to one embodiment, the display device 860 may further include at least one sensor (e.g., a fingerprint sensor, an iris sensor, a pressure sensor, or an illuminance sensor) of the sensor module 876 or a control circuit for the at least one sensor. In this case, the at least one sensor or the control circuit for the at least one sensor may be embedded in one portion of a component (e.g., the display 1010, the DDI 1030, or the touch circuitry 1050)) of the display device 860. For example, when the sensor module 876 embedded in the display device 860 includes a biometric sensor (e.g., a fingerprint sensor), the biometric sensor may obtain biometric information (e.g., a fingerprint image) corresponding to a touch input received via a portion of the display 1010. For example, when the sensor module 1076 embedded in the display device 860 includes a pressure sensor, the pressure sensor may obtain pressure information corresponding to a touch input received via a partial or whole area of the display 1010. According to one embodiment, the touch sensor 1051 or the sensor module 1076 may be disposed between pixels in a pixel layer of the display 1010, or over or under the pixel layer.

Figure 11:
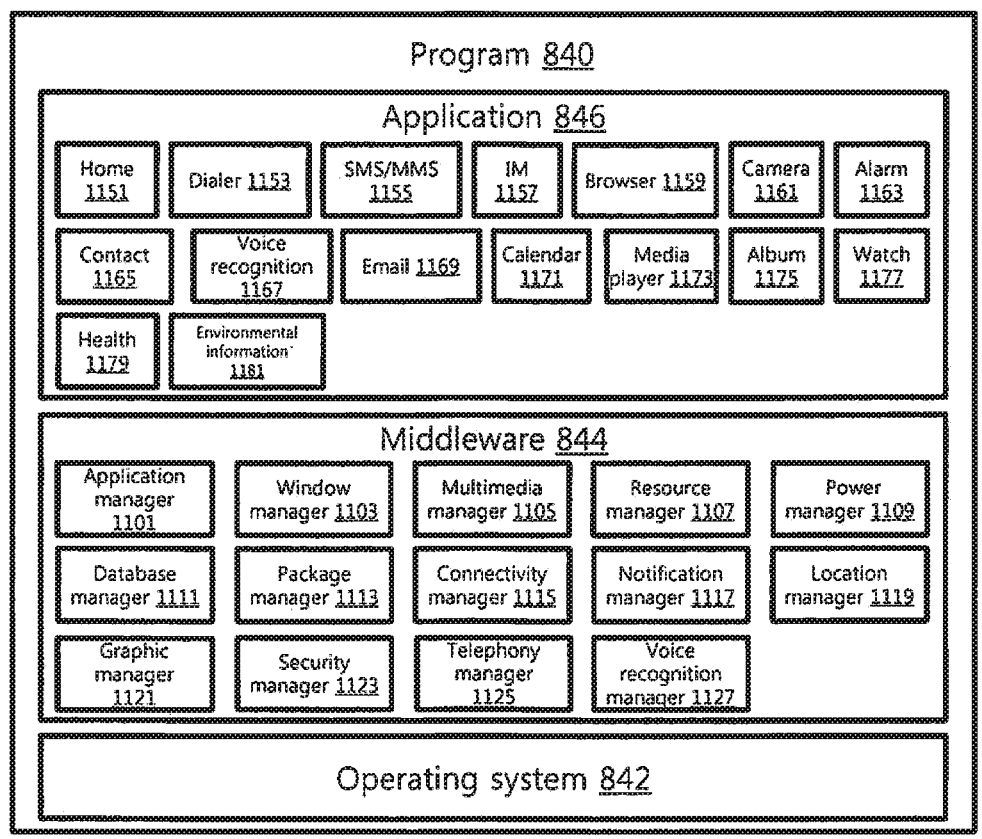
FIG. 11 is a block diagram of a program, according to one embodiment.

FIG. 11 is a block diagram of the program 840 according to one embodiment.

Referring to FIG. 11, the program 840 may include an OS 842 to control one or more resources of the electronic device 801, middleware 844, or an application 846 executable in the OS 842. The OS 842 may include, for example, Android®, iOS®, Windows®, Symbian®, Tizen®, or Bada™. At least part of the program 840, for example, may be pre-loaded on the electronic device 801 during manufacture, or may be downloaded from or updated by an external electronic device (e.g., the electronic device 802 or 804, or the server 808) during use by a user.

The OS 842 may control management (e.g., allocating or deallocation) of one or more system resources (e.g., process, memory, or power source) of the electronic device 801. The OS 842, additionally or alternatively, may include one or more driver programs to drive other hardware devices of the electronic device 801, for example, the input device 850, the sound output device 855, the display device 860, the audio module 870, the sensor module 876, the interface 877, the haptic module 879, the camera module 880, the power management module 888, the battery 889, the communication module 890, the subscriber identification module 896, or the antenna module 897.

The middleware may provide various functions to the application 846 such that a function or information provided from one or more resources of the electronic device 801 may be used by the application 846. The middleware 844 may include, for example, an application manager 1101, a window manager 1103, a multimedia manager 1105, a resource manager 1107, a power manager 1109, a database manager 1111, a package manager 1113, a connectivity manager 1115, a notification manager 1117, a location manager 1119, a graphic manager 1121, a security manager 1123, a telephony manager 1125, or a voice recognition manager 1127.

The application manager 1101, for example, may manage the life cycle of the application 846. The window manager 1103, for example, may manage one or more graphical user interface (GUI) resources that are used on a screen. The multimedia manager 1105, for example, may identify one or more formats to be used to play media files, and may encode or decode a corresponding one of the media files using a codec appropriate for a corresponding format selected from the one or more formats. The resource manager 1107, for example, may manage the source code of the application 846 or a memory space of the memory 830. The power manager 1109, for example, may manage the capacity, temperature, or power of the battery 889, and determine or provide related information to be used for the operation of the electronic device 801 based at least in part on corresponding information of the capacity, temperature, or power of the battery 889. According to one embodiment, the power manager 1109 may interoperate with a basic input/output system (BIOS) of the electronic device 801.

The database manager 1111, for example, may generate, search, or change a database to be used by the application 846. The package manager 1113, for example, may manage installation or update of an application that is distributed in the form of a package file. The connectivity manager 1115, for example, may manage a wireless connection or a direct connection between the electronic device 801 and the external electronic device. The notification manager 1117, for example, may provide a function to notify a user of an occurrence of a specified event (e.g., an incoming call, message, or alert). The location manager 1119, for example, may manage locational information on the electronic device 801. The graphic manager 1121, for example, may manage one or more graphic effects to be offered to a user or a user interface related to the one or more graphic effects.

The security manager 1123, for example, may provide system security or user authentication. The telephony manager 1125, for example, may manage a voice call function or a video call function provided by the electronic device 801. The voice recognition manager 1127, for example, may transmit a user's voice data to the server 808, and receive, from the server 808, a command corresponding to a function to be executed on the electronic device 801 based at least in part on the voice data, or text data converted based at least in part on the voice data. According to one embodiment, the middleware 844 may dynamically delete some existing components or add new components. According to one embodiment, at least part of the middleware 844 may be included as part of the OS 842 or may be implemented in other software separate from the OS 842.

The application 846 may include, for example, a home application 1151, a dialer application 1153, a short message service (SMS)/multimedia messaging service (MMS) application 1155, an instant message (IM) application 1157, a browser application 1159, a camera application 1161, an alarm application 1163, a contact application 1165, a voice recognition application 1167, an email application 1169, a calendar application 1171, a media player application 1173, an album application 1175, a watch application 1177, a health application 1179 (e.g., for measuring the degree of workout or biometric information, such as blood sugar), or an environmental information application 1181 (e.g., for measuring air pressure, humidity, or temperature information). According to one embodiment, the application 846 may further include an information exchanging application that is capable of supporting information exchange between the electronic device 801 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 1169) of the electronic device 801 to the external electronic device. Additionally or alternatively, the notification relay application may receive notification information from the external electronic device and provide the notification information to a user of the electronic device 801.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 12:
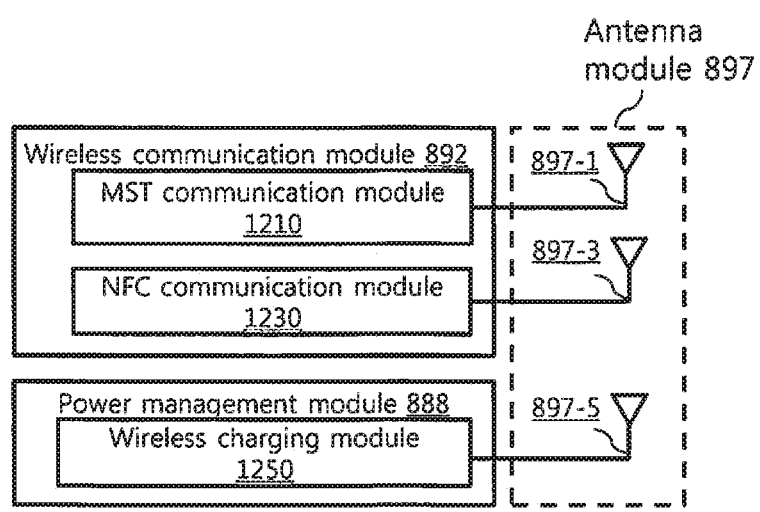
FIG. 12 is a block diagram of a wireless communication module, a power management module, and an antenna module of an electronic device, according to one embodiment.

FIG. 12 is a block diagram of the wireless communication module 892, the power management module 888, and the antenna module 897 of the electronic device 801, according to one embodiment.

Referring to FIG. 12, the wireless communication module 892 may include a magnetic secure transmission (MST) communication module 1210 or a near-field communication (NFC) module 1230, and the power management module 888 may include a wireless charging module 1250. In this case, the antenna module 897 may include a plurality of antennas that include an MST antenna 897-1 connected with the MST communication module 1210, an NFC antenna 897-3 connected with the NFC communication module 1230, and a wireless charging antenna 897-5 connected with the wireless charging module 1250. Descriptions of components described above with regard to FIG. 8 are either briefly described or omitted here.

The MST communication module 1210 may receive a signal containing control information or payment information such as card (e.g., credit card) information from the processor 820, generate a magnetic signal corresponding to the received signal, and then transfer the generated magnetic signal to the external electronic device 802 (e.g., a point-of-sale (POS) device) via the MST antenna 897-1. To generate the magnetic signal, according to one embodiment, the MST communication module 1210 may include a switching module that includes one or more switches connected with the MST antenna 897-1, and control the switching module to change the direction of voltage or current supplied to the MST antenna 897-1 according to the received signal. The change of the direction of the voltage or current allows the direction of the magnetic signal (e.g., a magnetic field) emitted from the MST antenna 897-1 to change accordingly. If detected at the external electronic device 802, the magnetic signal with its direction changing may cause an effect (e.g., a waveform) similar to that of a magnetic field that is generated when a magnetic card corresponding to the card information associated with the received signal is swiped through a card reader of the electronic device 802. According to one embodiment, for example, payment-related information and a control signal that are received by the electronic device 802 in the form of the magnetic signal may be further transmitted to an external server 808 (e.g., a payment server) via the network 899.

The NFC communication module 1230 may obtain a signal containing control information or payment information such as card information from the processor 820 and transmit the obtained signal to the external electronic device 802 via the NFC antenna 897-3. According to one embodiment, the NFC communication module 1230 may receive such a signal transmitted from the external electronic device 802 via the NFC antenna 897-3.

The wireless charging module 1250 may wirelessly transmit power to the external electronic device 802 (e.g., a cellular phone or wearable device) via the wireless charging antenna 897-5, or wirelessly receive power from the external electronic device 802 (e.g., a wireless charging device). The wireless charging module 1250 may support one or more of various wireless charging schemes including, for example, a magnetic resonance scheme or a magnetic induction scheme.

According to one embodiment, some of the MST antenna 897-1, the NFC antenna 897-3, or the wireless charging antenna 897-5 may share at least part of their radiators. For example, the radiator of the MST antenna 897-1 may be used as the radiator of the NFC antenna 897-3 or the wireless charging antenna 897-5, or vice versa. In this case, the antenna module 897 may include a switching circuit adapted to selectively connect (e.g., close) or disconnect (e.g., open) at least part of the antennas 897-1, 897-3, and 897-5, for example, under control of the wireless communication module 892 (e.g., the MST communication module 1210 or the NFC communication module 1230) or the power management module (e.g., the wireless charging module 1250). For example, when the electronic device 801 uses a wireless charging function, the NFC communication module 1230 or the wireless charging module 1250 may control the switching circuit to temporarily disconnect at least one portion of the radiators shared by the NFC antenna 897-3 and the wireless charging antenna 897-5 from the NFC antenna 897-3 and to connect the at least one portion of the radiators with the wireless charging antenna 897-5.

According to one embodiment, at least one function of the MST communication module 1210, the NFC communication module 1230, or the wireless charging module 1250 may be controlled by an external processor (e.g., the processor 820). According to one embodiment, at least one specified function (e.g., a payment function) of the MST communication module 1210 or the NFC communication module 1230 may be performed in a trusted execution environment (TEE). According to one embodiment, the TEE may form an execution environment in which, for example, at least some designated area of the memory 1230 is allocated to be used for performing a function (e.g., a financial transaction or personal information-related function) that requires a relatively high level of security. In this case, access to the at least some designated area of the memory 830 may be restrictively permitted, for example, according to an entity accessing thereto or an application being executed in the TEE.

According to one embodiment, the present system and method provides a two-stage motion compensation scheme in video super resolution to improve the quality of an output video. An HR motion compensation module is integrated into the video super resolution system, after LR motion compensation and spatial super resolution. Since both LR motion and HR motion are considered, the output video has better quality as compared to conventional methods.

The present system may include a super resolution network for efficient HR motion estimation. The network receives an LR optical flow as input, and outputs an HR optical flow. As a result, HR motion estimation may be executed in parallel with spatial super resolution, which is much faster as compared to directly estimating HR optical flow.

Deep learning methods have shown considerable performance in video super resolution. However, most of the conventional deep learning SR systems only utilized LR motion for alignment, which limits the quality of the output video.

In the present disclosure, a two-stage motion compensation scheme for video super resolution is described below. The present system receives a LR input video. The present system includes a LR motion compensation module that applies LR motion compensation to the LR input video. Aligned frames are provided to a multi-image spatial super resolution network to upsample the frames to a desired size of HR frames (intermediate HR frames). The present system further includes a HR motion compensation module that refines the intermediate HR frames to a final output.

In LR motion compensation, an optical flow is extracted by a second generation of a method of learning optical flows with convolutional networks called FlowNet 2.0. LR image warping is then applied to the extracted optical flow. According to one embodiment, in multi-image spatial super resolution, a cascade trained super resolution CNN with a three dimensional (3D) convolution layer is used to generate intermediate HR frames. According to one embodiment, in HR motion compensation, an HR optical flow may be extracted by either FlowNet 2.0 or applying an SR network on an LR flow. By incorporating these stages, the present system may construct an accurate video super resolution CNN with relatively low computation cost.

According to one embodiment, the present system and method constructs a video super resolution system via two-stage motion compensation to improve output quality. According to one embodiment, the present system and method determines an HR optical flow based on an LR optical flow input to maintain low complexity when using HR motion compensation. The present system and method fuses multiple frames in HR motion compensation based on weights that are penalized by the motion.

According to one embodiment, the present system provides video super resolution that retrieves information from an LR video to generate an HR video. The present system learns a very deep convolution neural network with two-stage motion compensation. The present system is different from conventional SR networks that have only one LR motion compensation stage.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
   receiving a video with one or more first frames having a low resolution (LR);
   generating one or more warped frames from the one or more first frames based on a first type of motion compensation that includes learning an LR optical flow of neighboring frames around a reference frame in the video;
   generating one or more second frames having a high resolution (HR) by learning an HR optical flow by performing super resolution (SR) processing on the LR optical flow;
   generating warped HR frames based on the HR optical flow; and applying a fusion to the warped HR frames to generate refined frames of an HR video, wherein each of the one or more second frames is derived using a convolutional network.

2. The method of claim 1, wherein the video is an LR video, and generating the one or more warped frames comprises:

generating warped LR frames of the neighboring frames around the reference frame in the LR video based on the LR optical flow.

3. The method of claim 2, wherein learning the LR optical flow is comprised of training an ensemble of deep fully convolutional neural networks (CNNs) on ground truth optical flow data and applying the ensemble of deep fully CNNs directly to frames of the LR video.

4. The method of claim 1, wherein generating the one or more second frames having the HR comprises using a deep convolutional neural network deploying a three dimensional (3D) convolutional operator.

5. The method of claim 1, further comprising generating one or more third frames having the HR based on a second type of motion compensation.

6. The method of claim 1, wherein learning the HR optical flow comprises training an ensemble of deep fully convolutional neural networks (CNNs) on ground truth optical flow data and applying the ensemble of deep fully CNNs directly to frames of the HR intermediate frames.

7. The method of claim 1, wherein applying the weighted fusion comprises identifying pixels in neighboring frames that correspond to those in a reference intermediate frame based on the learned HR optical flow for each neighboring frame, and applying the weighted fusion based on Gaussian weights and motion penalization based on a magnitude of the optical flow.

8. The method of claim 1, wherein performing SR on the LR optical flow comprises training a deep full convolutional neural network to perform SR on the LR optical flow where ground truth HR optical flow is estimated by applying HR optical flow on ground truth HR frames.

9. An apparatus, comprising:

a receiver configured to receive a video with one or more first frames having a low resolution (LR);

an LR compensation device configured to generate one or more warped frames from the one or more first frames based on a first type of motion compensation that includes learning an LR optical flow of neighboring frames around a reference frame in the video; and a multi-image spatial super resolution (SR) device configured to:

generate one or more second frames having a high resolution (HR) by learning an HR optical flow by performing SR processing on the LR optical flow;

generate warped HR frames based on the HR optical flow; and apply a fusion to the warped HR frames to generate refined frames of an HR video, wherein each of the one or more second frames is derived using a convolutional network.

10. The apparatus of claim 9, wherein the video is an LR video, and the LR compensation device is further configured to:

generate warped LR frames of the neighboring frames around the reference frame in the LR video based on the LR optical flow.

11. The apparatus of claim 10, wherein the LR compensation device is further configured to train an ensemble of deep fully convolutional neural networks (CNNs) on ground truth optical flow data and applying the ensemble of deep fully CNNs directly to frames of the LR video.

12. The apparatus of claim 9, wherein the multi-image spatial SR device is further configured to use a deep convolutional neural network deploying a three dimensional (3D) convolutional operator.

13. The apparatus of claim 9, further comprising an HR compensation device configured to generate one or more third frames having the HR resolution based on a second type of motion compensation.

14. The apparatus of claim 9, wherein the HR compensation device is further configured to train an ensemble of deep fully convolutional neural networks (CNNs) directly to frames of the HR intermediate frames.

15. The apparatus of claim 13, wherein the HR compensation device is further configured to identify pixels in neighboring frames that correspond to those in a reference intermediate frame based on the learned HR optical flow for each neighboring frame, and apply the weighted fusion based on Gaussian weights and motion penalization based on a magnitude of the optical flow.

16. The apparatus of claim 9, wherein the multi-image spatial SR device is further configured to perform SR on the LR optical flow by training a deep full convolutional neural network to perform SR on the LR optical flow where ground truth HR optical flow is estimated by applying HR optical flow on ground truth HR frames.

* * * * *